June 27, 1961  B. R. BETTER ET AL  2,990,188
TOOL HOLDER—ROTARY LOCKING TYPE
Filed Dec. 21, 1959  2 Sheets—Sheet 2
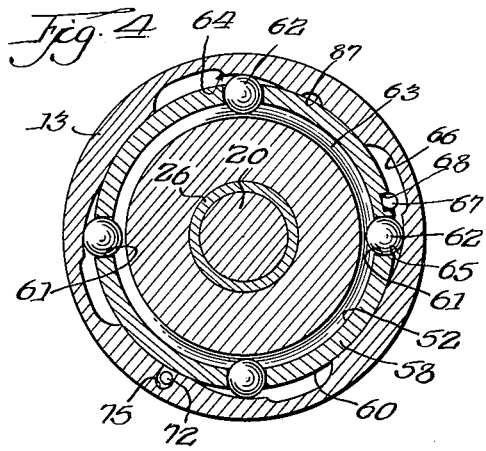
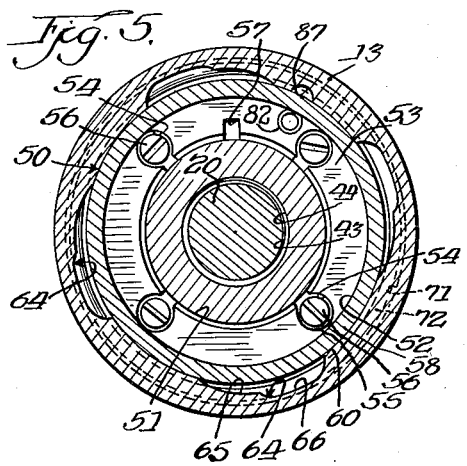
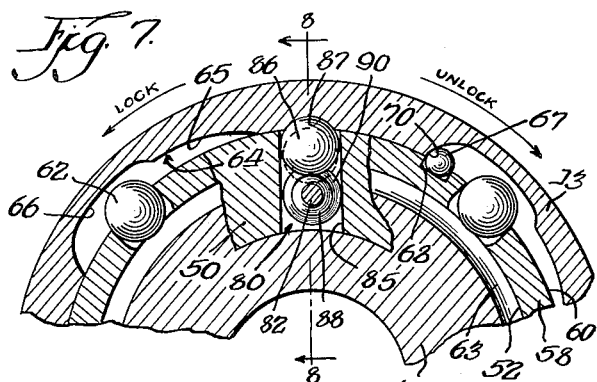
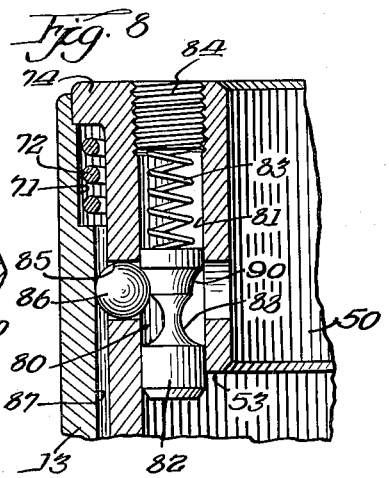
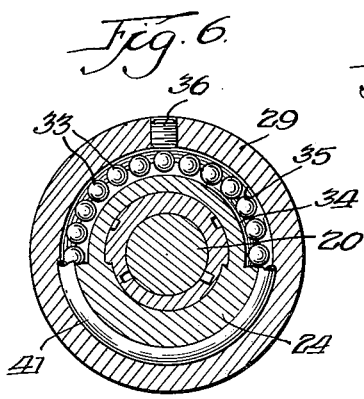
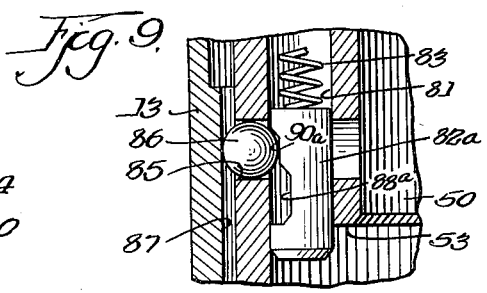
Inventors.
Bernard R. Better, &
Joseph W. Kosinski.
By Brown, Jackson, Boettcher & Dienner
Attys.

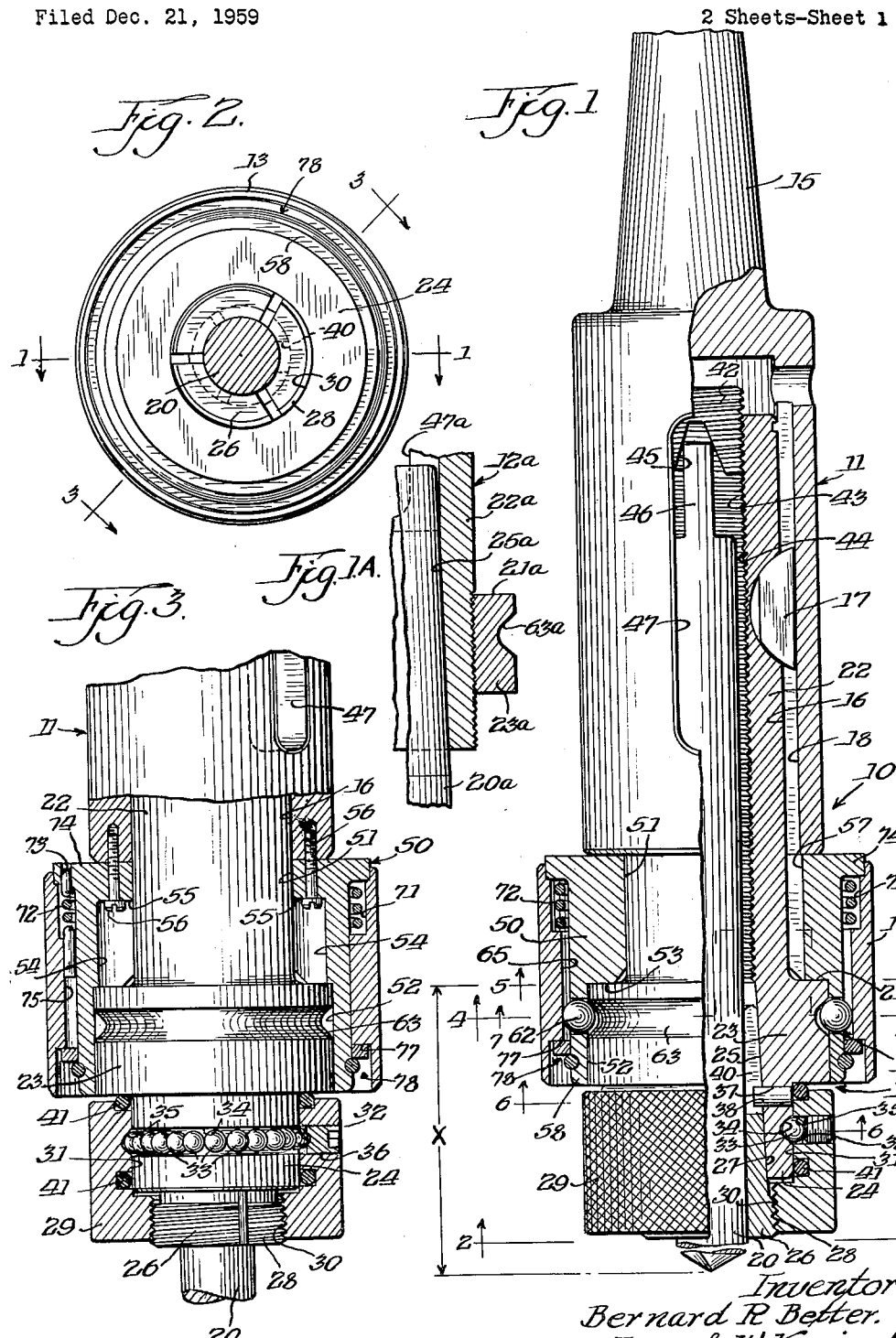

United States Patent Office 2,990,188
Patented June 27, 1961

2,990,188
TOOL HOLDER—ROTARY LOCKING TYPE
Bernard R. Better, Chicago, and Joseph W. Kosinski, Riverside, Ill., assignors to Scully-Jones and Company, Chicago, Ill., a corporation of Illinois
Filed Dec. 21, 1959, Ser. No. 860,855
10 Claims. (Cl. 279—75)

Our present invention relates to chucks and tool holding devices which are particularly adapted for use in multiple spindle machines or in machines in which presetting of the tools is desired.

One of the objects of our present invention is to provide a new and improved adjustable tool holding assembly having a spindle conversion sleeve or adapting sleeve, an adjusable adapter or means for holding a tool therein which may be preset outside the adapting sleeve to any desired setting, and which is greatly simplified in its construction and operation over conventional or prior type tool-holding means.

Still another and important object of our invention is the provision of means in an adjustable tool-holding assembly having rotary type locking means to facilitate the quick insertion and removal of an adjustable adaptor into and from a spindle adapting sleeve of said assembly.

Still another object of the invention is to provide a new and improved adjustable tool-holding assembly by which a tool holder or adaptor and the tool carried thereby may be quickly removed from the assembly and it or a like adaptor may be quickly inserted therein; the removal and insertion taking place with only one manual rotary action.

We accomplish the above objects by the provision in the tool-holding assembly of a spindle adapting sleeve into which an adjustable adaptor or tool-holding means may be inserted. The tool holder has means permitting the holder and the tool held therein to be preset outside the adapting sleeve, and cooperating with a rotary type locking means on the adapting sleeve to lock the tool holder therein. Means are also provided in the sleeve whereby upon rotary manual operation thereof, the tool holder is released, at which time still another means on the adapting sleeve acts to hold the locking means in an unlocked position until the tool holder or a like holder is again inserted in the assembly. The arrangement is such that the tool is drawn up axially of the sleeve with substantially no clearance, so as to avoid any appreciable axial movement, by the locking means.

In the illustrated embodiment, the means for permitting presetting and for cooperating with the rotary locking means is a shoulder on the tool holder, the rotary locking means comprises a plurality of balls actuated by camming means in a manually operable rotary collar, and the means for holding the rotary locking means in an unlocked position is an axially movable spring-biased retainer.

Accordingly, a further object of the invention is the provision of a tool holding assembly having locking means by which a tool holder is securable in the assembly for rotational movement while being held in axially drawn up position in the assembly so as to avoid any substantial axial clearance and prevent axial play between the tool holder and the remainder of the assembly.

Still another and more particular object of the invention is the provision of a tool holding assembly having rotary type tool holder locking means comprising a plurality of balls which are cam actuated by a manually rotatable collar, and an axially movable spring-biased retainer to hold the locking means in unlocked position when the tool holder is removed from a spindle adapting sleeve of the assembly.

Other and more particular objects of our invention will be apparent to those skilled in the art from the following description aid drawings froming a part hereof and wherein:

FIGURE 1 is an elevational view, partially in section substantially along line 1—1 of FIGURE 2 and looking in the direction of the arrows, illustrating a tool holding construction according to our invention with the tool holder or adaptor locked in the spindle adapting sleeve thereof;

FIGURE 1a is a fragmentary longitudinal sectional view similar to a portion of FIGURE 1, but showing a modified construction;

FIGURE 2 is an end view taken substantially along line 2—2 of FIGURE 1 and looking in the direction of the arrows;

FIGURE 3 is a longitudinal sectional view, showing in part the internal details of the locking means with a tool holder locked thereby, taken substantially along line 3—3 of FIGURE 2 and looking in the direction of the arrows;

FIGURE 4 is a cross-sectional view, taken substantially along line 4—4 of FIGURE 1 and looking in the direction of the arrows, illustrating to advantage the balls and cams of the rotary locking means;

FIGURE 5 is a cross-sectional view taken substantially along line 5—5 of FIGURE 1 and looking in the direction of the arrows;

FIGURE 6 is a cross-sectional view taken substantially along line 6—6 of FIGURE 1 and looking in the direction of the arrows, illustrating to advantage the tool chucking portion of the tool holder;

FIGURE 7 is a fragmentary enlarged cross-sectional view taken substantially as indicated by the jogged section line 7—7 of FIG. 1, somewhat rotated, illustrating the retaining means for maintaining the rotary locking means in unlocked position;

FIGURE 8 is a fragmentary longitudinal sectional view taken substantially along line 8—8 of FIGURE 7 and looking in the direction of the arrows, to illustrate to advantage the retaining means; and FIGURE 9 is an enlarged fragmetary view of another embodiment of a retaining means.

As shown in these drawings, the illustrated embodiment of our adjustable tool-holding assembly is indicated in its entirety as 10, and has a body member or spindle adapting sleeve indicated in its entirety as 11, and an adjustable tool holder or adaptor indicated in its entirety as 12, which is received in telescoping relationship in the adapting sleeve as shown and held therein by a manually rotatable collar 13, which surrounds the sleeve and co-operates with and forms part of a locking means indicated in its entirety as 14.

The spindle adapting sleeve 11 is provided with a tapered reduced end or shank portion 15 of a conventional type, whereby the same may be inserted in an automatic machine tool spindle for rotation and operation therewith. A central bore 16 extends inwardly from the other end of the adapting sleeve 11 to receive the tool holding means 12. Means such as a Woodruff key 17 engaging a keyway 18 in the interior of the sleeve serves to slidably mount the tool holding means 12 in the sleeve 11 for rotation therewith and thereby.

As herein previously mentioned, one of the important features of our invention lies in the fact that the adjustable adaptor or tool holder 12 permits a tool, such as illustrated at 20 in FIGURE 1, to be preset in a simple manner within the adaptor 12, and this preset adaptor and tool may be quickly locked in, or removed from, the spindle adapting sleeve 11. Also, as mentioned, another important feature of our invention is the reduction in the number of manual operations heretofore necessary to insert, lock, and remove the adaptor from the adapting sleeve.

Such features will now be described.

In connection with the adapter 12, the means for aiding the presetting of the tool 20 comprises a presetting shoulder 21 formed between a hollow reduced cylindrical portion or shank 22 thereof, which is received in the bore 16 of the spindle adapting sleeve 11, and an enlarged portion or flange 23, which together with the end of the tool 20 allows the presetting of the tool at a length such as X, shown in FIGURE 1, according to a predetermined standard, as hereinafter more fully described.

The adapter 12 is provided, in the embodiment illustrated, with a hollow cylindrical extension 24 of substantially the same outer diameter as the reduced portion 22 and axially conically bored as at 25 to receive a split-ring-type collet 26 (see FIGURE 2). The tapered bore 25 mates with an outer tapered periphery 27 on the split-ring type collet 26. An axially outer end portion of the collet 26, projecting out of the extension 24, is threaded externally, as at 28, to receive a knurled adjusting nut 29 internally threaded as at 30. The nut 29 is counterbored as at 31 and telescoped over the outer periphery of extension 24, so as to rotate thereabout for engagement of the threads 28 and 30. The nut 29 is also provided with a radially extending bore 32 by means of which a plurality of ball bearings 33 (see FIGURES 3 and 6) are inserted so that they may seat in a peripheral groove 34 in the outer periphery of the extension 24. Balls 33 serve as a retaining and bearing guide means as the adjusting nut 29 rotates to hold the nut 29 in substantially fixed axial position on the extension 24. To accomplish this purpose, the groove 34 should be of a depth to only partially receive the balls 33, as illustrated in FIGURE 1, and the adjusting nut 29 is also provided with a groove 35 which complements the groove 34, as illustrated in FIGURES 3 and 6. The bore 32 serves only to provide a means for filling the complementary grooves 34 and 35, and a threaded plug 36 serves as a closure means for the bore 32. Extension 24 is also provided with a radially extending bore 37, adjacent the flange 23, receiving a retaining pin 38 which is of a length to extend radially inwardly from the periphery of extension 24 into an axial slot 40 in the collet 26 to prevent the latter from turning with respect to the extension 24.

Thus, as the adjusting nut 29 is rotated in one direction, it threads the collet axially inwardly along the conical surface 25 of extension 24, the pin 38 preventing rotation of the collet. Such inward movement causes the inner dimension of the collet 26 to decrease by reason of the conical surfaces 25 and 27, and chuck the tool 20 in a conventional manner. Reverse rotation of the nut 29 effects release of the tool. Suitable sealing rings, such as 41, may be provided where thought necessary or desirable.

In the operation of my tool holding means 12, as can be appreciated, the latter may be removed from the adapting sleeve 11 in a manner to be described, and the tool 20 may be preset a prescribed distance, such as X, measured from the presetting shoulder 21 to the cutting point of the tool. Thus when the tool 20 is removed from the sleeve 11 and sharpened (which shortens the tool), the tool may be adjusted to compensate for the shortening thereof by turning the nut 29 to loosen tool 20 in the collet 26, so that the cutting end of the tool may be preset a predetermined distance X from the shoulder 21 by the use of a suitable gage or standard. Continued sharpening and shortening of the tool 20 may be thus accommodated, to locate the cutting end of the tool in the desired relation to the spindle and to the work. The centerline and rigidity of the tool are maintained by an adjusting screw 42 which is threadedly received in internal threads 43 of the bore 44 in the hollow reduced portion or shank 22 of the adapter previously mentioned. Screw 42 is provided with a slot or groove 45 in which a flattened shank end portion 46 of the tool 20 engages. It will be appreciated that when tool 20 is loose in the collet 26, the screw 42 may be turned in the threads 43 by rotation of tool 20 through engagement of the flattened end portion 46 of the tool in the groove 45 of screw 42. Tightening of the collet 26 about tool 20 and the seated engagement of the end 46 of the tool 20 in the slot 45 of screw 42 thus impart rigidity to the tool during operation, as well as assuring proper axial alignment of the tool in the assembly. A conventional knockout slot 47 may be provided in the adapting sleeve 11, and a similar aperture (not shown) registrable therewith may be employed in the shank 22.

It is to be noted in connection with the tool holding means 12 that, if desired, the presetting shoulder 21 and the immovable flange 23 could be replaced, as shown fragmentarily in FIG. 1A, with a movable presetting surface 21a on a rotatable collar 23a which is threadedly received on a threaded shank 22a. In this structure, the conical surface or bore 25a would be suitably adapted to receive a conventionally tapered shank of a tool 20a.

In the embodiment illustrated in FIGURE 1, the overhang or projection of the tool 20 is maintained at a minimum by telescoping the tool within the tool holder where a machining operation requires minimum overhang, while in the embodiment illustrated in FIG. 1a the tool 20a may have a relatively great overhang. The tool holder 12a will not require the split type collet 26 or the adjusting nut 29, since the tool 20a is provided with a conventional taper. A knockout slot, such as 47a, may also be provided in the shank 22a of the holder or adapter 12a.

The embodiment shown in FIGURE 1A will cooperate with the locking means 14 in the same manner as the embodiment shown in FIGURE 1, as will be appreciated from the following detailed description of the locking means.

The locking means 14 comprises, in the embodiment illustrated, a lock body member 50 which has a central bore 51 registering with the inner face of the sleeve 11 to receive the adapter shank 22, and is also formed with a counterbore 52 which provides an abutment or shoulder 53 against which the presetting surface or shoulder 21 of the tool holder or adapter engages. The tool 20 may thus be properly positioned or gaged relative to the sleeve 11, to which the lock body member 50 is detachably secured. A plurality of bores 54 (FIGS. 3 and 5) spaced about the bore 51 extend inwardly from the shoulder 53 to provide as many ledges or radial surfaces 55 engageable by suitable bolt means 56 by which the lock body member 50 is attached to the open end edge of the adapting sleeve 11. The lock body member 50 is also provided with a keyway 57 which forms an extension of the keyway 18 of the adapting sleeve.

It should be pointed out here that while the lock body member 50 has been shown as a part separable from the sleeve 11, it may be formed as an integral part of the sleeve, where thought necessary or desirable. On the other hand, the lock body member 50 may be used as a separable part where the adapting sleeve 11, instead of being a detachable part with a tapered attaching portion 15 by which it is secured in a machine tool spindle which drives the entire assembly, forms a part of the machine tool spindle itself, or where the spindle is formed substantially like the sleeve 11. In other words, the lock body member 50 may be attached directly to the machine tool spindle where thought desirable.

Turning now to FIGURES 4, 5, and 7, it can be seen that the lock body member 50 is provided with a cylindrical skirt portion 58 defined between the counterbore 52 and the outer periphery 60 of the lock body member 50. A plurality of radial apertures 61, in this instance four, are formed in the skirt portion 58, in circumferentially spaced relation and in the same diametrical plane. In each aperture is a lock ball 62, of a diameter greater than the thickness of the skirt portion 58, so that when disposed in the apertures 61 the adapter lock balls 62 may engage in a peripheral groove 63 in the flange 23 of the tool holding means 12. Lock balls 62 also extend, by reason of their diameter, beyond the periphery 60 of the lock body member 50 and contact camming surfaces generally designated 64 on the interior of the manually rotatable lock collar 13, previously mentioned.

As can be seen in these figures, camming surfaces 64 effect movement of lock balls 60 radially inwardly into the groove 63 on the tool holding means 12 upon locking rotation of the collar 13. Each camming surface comprises a curved surface portion 65 which extends generally circumferentially from immediately adjacent the outer periphery 60 of the lock body member 50 and gradually diverges therefrom, and opens laterally or circumferentially into a recess 66. The recesses 66 are of sufficient depth to permit the associated balls 62 to move radially outwardly out of the groove 63, so as to release and permit the withdrawal of the flange 23. The camming surfaces 64 may have any suitable extent longitudinally of the collar 13.

From the description thus far given of the locking mechanism 14, it can be seen that the four camming surface portions 65 and recesses 66 are so constructed and arranged that rotation of lock collar 13 to the left, or counterclockwise, as viewed in these figures, will cause the balls to be actuated by the locking cam portions 65 which urge the lock balls radially inwardly into the groove 63 to lock the adapter 12 in the member 50 and sleeve 11. Manual rotation of lock collar 13 to the right, or clockwise, will permit the lock balls 62 to unlock the adapter 12 by reason of the fact that the balls are now free to enter the recesses 66 and be disengaged from the groove 63. A collar stop is provided in the form of a ball 67, which rests in a depression 68 in the outer surface 60 of lock body member 50 adjacent one of the apertures 58 and projects slightly outwardly of the outer periphery 62 of the body member, so as to engage a side edge or surface 70 of the associated recess 66, opposite the curved portion 65. This prevents excessive rotation of the collar 13 in the clockwise direction when the adapter is being unlocked, and forestalls any possibility of the lock retaining means hereinafter described from engaging with camming surfaces 64. The stop ball 67 has a diameter greater than the depth of the associated recess 66 plus the total clearance between the lock collar 13 and the skirt portion 58 of the lock body member 50, so that it is retained in the depression 68 at all times.

As is exaggeratedly shown in FIG. 1, the relative location of the lock balls 62 and the groove 63 in the tool holder or adapter 12, axially of the adapter, is such that the balls engage the axially inner surface of the groove rather than the axially outer surface, so as to tend to cam or draw the adapter 12 axially inwardly of the sleeve 11 and lock body member 50. Thus the presetting shoulder 21 of the adapter is engaged tightly against the abutment shoulder 53 of the lock body member 50 and any substantial clearance therebetween is avoided or taken up, so that the adapter is held against any appreciable play axially of the assembly, and axial backlash is substantially eliminated. By this means, the desired precise positioning of the tool holder or adapter 12 axially of the assembly is effectively accomplished, and the desired length or distance X is maintained.

As can be seen from the disclosure of FIGURES 1 and 3, the lock collar 13 is provided with a suitable counterbore 71 at its upper end, as viewed in the figures, to accommodate a helical type spring 72, the ends of which are suitably formed to be retained one in an aperture 73 in a small radially extending end flange 74 of the lock body member 50, and the other in a longitudinal groove 75 in the inner face of collar 13. In this manner, spring 72 may operate to rotate the lock collar 13 counterclockwise from its unlocked or releasing position toward its locking position, upon release of lock retaining means yet to be described. It is to be noted that the lock collar 13 is also provided at its opposite end with another counterbore 76 which provides a shoulder 77 engaging with a retaining ring assembly generally designated 78 to hold the collar 13 on the lock body member 50.

Now, as to the lock retaining means, indicated in its entirety as 80, and which forms an important feature of our invention, as mentioned hereinbefore, attention is now directed to FIGURES 7 and 8. In these figures, it can be seen that the lock body member 50 is provided with an axial bore 81 having one end opening through the shoulder 53 and the other end closed. Received slidably in the bore 81 is a plunger 82 biased to project outwardly of shoulder 53 by a helical spring 83 engaged between the inner end of the plunger and the closed end of the bore, shown as defined in this instance by a plug 84 threaded into the bore. The lock body member 50 is formed with a radial bore 85 intersecting bore 81 and receiving a lock retainer ball 86 freely movable therein. Lock retainer ball 86 is of a diameter sufficient to extend radially outwardly into an axial groove 87 in the collar 13, and radially inwardly of the lock body member so as to extend into the bore 81. Plunger 82 is provided, intermediate its ends, with two circumferential camming surfaces 88 and 90 each arcuately curved in the axial direction on a radius corresponding to that of the ball 86, for cooperation therewith. The surface 88 extends radially inwardly of the plunger a distance or depth sufficient to allow the ball to be positioned completely out of groove 87, as indicated in dotted lines in FIG. 7. Surface 90 is located immediately inwardly of surface 88, and has its most radially inward portion so spaced from the plunger axis as to force ball 86 into fully engaged position in groove 87, as shown in solid lines in FIGS. 7 and 8. The plunger 82 is biased by the spring 83 to this solid-line position, in which the surface 88 is located at least partially beyond the bore 85 in the direction of the open end of the bore 81.

The operation of the locking plunger is as follows, starting with the position illustrated in FIG. 8, which corresponds to the releasing position of the collar 13, with no adapter 12 or the like disposed in the adapting sleeve 11. When adapter 12 is inserted in the lock body member 50, the presetting surface or shoulder 21 engages the outer end of the plunger 82, which projects outwardly of shoulder 53, and moves the plunger inwardly of bore 81 against the force of spring 83 until the camming surface 88 of the plunger reaches a centered position relative to the bore 85. In this position, the ball 86 is free to move out of the axial groove 87, so that it allows the collar 13 to be rotated by the helical spring 72 towards its locking position, in which the lock balls 60 are urged by the camming surfaces 65 into the peripheral slot 63 in the adapter flange 23, as previously explained, to lock the adapter in the member 50. When it is desired to remove the adapter from the adapting sleeve, the collar 13 is returned to its releasing position, by manual rotation against the force of spring 72, so that the lock balls 62 move to the recesses 66, in which they are free of any radial force by the camming surfaces 65, to permit them to be moved out of the adapter groove 63. The adapter 12 is thus free to be pulled axially out of the adapting sleeve and as it is withdrawn it allows the plunger 82 to be moved outwardly, or downwardly as viewed in FIG. 8, by the spring 83. The ball 86, by the camming action of the surfaces 88 and 90, is urged radially outwardly into the groove 87, where it is held by the surface 90. This locks the collar 13 in its releasing position. The collar 13 will remain in its releasing position until such time as the adapter 12, or a similar adapter, either of the type shown in FIGURE 1A or of the type illustrated in FIGURES 1 to 3, is again inserted in the lock body member 50.

Turning now to FIGURE 9, there is illustrated another embodiment of our invention in which a plunger 82a functions in a manner identical to that of plunger 82 of FIGURES 7 and 8, except that in this embodiment camming surfaces 88a and 90a respectively corresponding to the cam surfaces 88 and 90 are formed as notches in the plunger, instead of extending circumferentially about the plunger. The function and operation of this embodiment of the plunger are identical with the function and operation of the plunger 82, so no further description is deemed necessary.

From the above description, it can be seen that we have provided a chuck or tool holding device which is considerably simplified, which needs no special wrenches or other implements to insert or remove the tools from automatic machines, and which in actual practice provides advantages set forth above, namely, a reduction in manual operations, a simplicity of adapter tools, and a means of presetting tools in a multiple spindle unit. While there have been shown only two embodiments of the tool holding means and one type of tool in one spindle, obviously, one spindle will accommodate similar tool holding means permitting one tool holding means to be in use while others are being sharpened and reset, thus reducing the time the machine is inoperative.

Where herein the various parts of our invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention, and the invention is defined and comprehended solely by the appended claims which should be construed as broadly as the prior art will permit.

We claim:

1. A presettable cutting tool holding means comprising a rotatable spindle sleeve, a tool holder for holding a cutting tool, engaging means on said tool holder including presetting means for permitting gaging of said tool against a preselected standard, means for receiving said tool holder in said sleeve, rotatable locking means on said sleeve cooperating with said engaging means for locking said tool holder against axial movement in said sleeve, means on said sleeve to unlock said engaging means to permit removal of said tool holder from said sleeve, and means for retaining said locking means in unlocked position when said tool holder is removed from said sleeve and adapted to be rendered inoperative by insertion in said sleeve of means including presetting means.

2. A presettable cutting tool holding means comprising a rotatable sleeve, a tool holder engageable in said sleeve including presetting means on said tool holder for permitting gaging of a tool held thereby against a preselected standard, rotatable locking means on said sleeve for locking said tool holder axially in said sleeve, means on said sleeve to unlock said tool holder to permit removal of said tool holder from said sleeve, and means for holding said locking means in unlocked position when said tool holder is removed from said sleeve and adapted to be rendered inoperative by insertion of a tool holder in said sleeve.

3. A cutting tool holding device comprising a rotatable spindle sleeve, tool holding means engageable in said sleeve, locking means on said sleeve rotatable for locking said tool holding means axially therein and for unlocking said tool holding means to permit removal thereof from said sleeve, and means for holding said locking means in unlocking position when said tool holding means is removed from said sleeve and adapted to be rendered inoperative by insertion of tool holding means in said sleeve.

4. A tool holding device comprising a rotatable sleeve, a tool holder engageable in said sleeve, locking means on the sleeve rotatable for locking said tool holder in predetermined axial position therein and for unlocking the tool holder to permit removal thereof from the sleeve, and means for holding said locking means in unlocking position when the tool holder is removed from the sleeve.

5. A tool holding device comprising a rotatable sleeve, a tool holder engageable in said sleeve, locking means on said sleeve rotatable between locking and unlocking positions respectively holding said tool holder in substantially fixed axial position in the sleeve and releasing the holder for removal thereof from the sleeve, means biasing said locking means for rotation to said locking position, and lock retaining means holding the locking means in the unlocking position in the absence of the tool holder from the sleeve and operable by insertion of a tool holder in the sleeve to release the locking means for rotation thereof to locking position by said biasing means.

6. A presettable cutting tool holding assembly comprising a rotatable sleeve, tool holding means for holding a cutting tool, engaging means including presetting means on said tool holding means for permitting gaging of said tool against a preselected standard, means for receiving said tool holding means in said sleeve, rotatable locking means on said sleeve cooperating with said engaging means for locking said tool holding means in said sleeve, release means on said sleeve to render said locking means inoperative to permit removal of said tool holding means from said sleeve, and means for actuating said release means when said tool holding means is removed from said sleeve.

7. A presettable cutting tool holding assembly comprising a rotatable sleeve, tool holding means engageable in said sleeve, means including presetting means on said tool holding means for permitting gaging against a preselected standard of a tool held thereby, a peripheral groove on said tool holding means, rotatable locking means on said sleeve including camming means cooperating with said peripheral groove for axially locking said tool holding means in said sleeve, release means on said sleeve to render said locking means inoperative to permit removal of said tool holding means from the sleeve, and means for actuating said release means when said tool holding means is removed from said sleeve and adapted in turn to be rendered inoperative by insertion in the sleeve of means including presetting means.

8. A tool holding assembly comprising a rotatable sleeve, tool holding means engageable in said sleeve, a circumferential groove on said tool holding means, rotatable locking means on said sleeve including camming means cooperating with said groove for locking said tool holding means axially in said sleeve, release means on said sleeve to render said locking means inoperative to permit removal of said tool holding means from the sleeve, and means including other camming means for actuating said release means when said tool holding means is removed from said sleeve.

9. A cutting tool holding assembly comprising a rotatable spindle sleeve, tool holding means engageable in said sleeve, means on said tool holding means for engaging the sleeve to determine the axial relation thereof, a peripheral groove on said tool holding means, a rotatable locking collar on the sleeve having camming surfaces, balls actuatable by said camming surfaces to engage in said groove for axially locking said tool holding means in said sleeve, release means on said collar to allow said balls to disengage from said groove to permit removal of said tool holding means from the sleeve, and means for holding said release means in position to allow disengagement of said balls from said groove when said tool holding means is removed from said sleeve and adapted in turn to be rendered inoperative upon insertion in said sleeve of engaging means.

10. A tool holding device comprising a rotatable spindle sleeve, a tool holder engageable in said sleeve, a peripheral groove on said tool holder, a rotatable locking collar having camming means, balls adapted to be urged by said camming means into said groove when said collar is in one position for axially locking said tool holder in said sleeve, release means on said collar to render said camming means inoperative so as to permit removal of said tool holder from the sleeve when said collar is in a second position, and means for holding said collar in said second position when said tool holder is removed from said sleeve.

References Cited in the file of this patent
UNITED STATES PATENTS

| | | |
|---|---|---|
| 1,781,442 | Currier | Nov. 11, 1930 |
| 2,807,473 | Kiehne | Sept. 24, 1957 |
| 2,926,020 | Dayton | Feb. 23, 1960 |